April 6, 1937. M. B. TARK Re. 20,320

SETTLING SYSTEM FOR SEPARATING SOLIDS FROM FLUIDS

Original Filed June 18, 1929 4 Sheets-Sheet 1

INVENTOR.
Marcus B. Tark
BY Wright Brown
ATTORNEYS

April 6, 1937. M. B. TARK Re. 20,320
SETTLING SYSTEM FOR SEPARATING SOLIDS FROM FLUIDS
Original Filed June 18, 1929 4 Sheets-Sheet 2
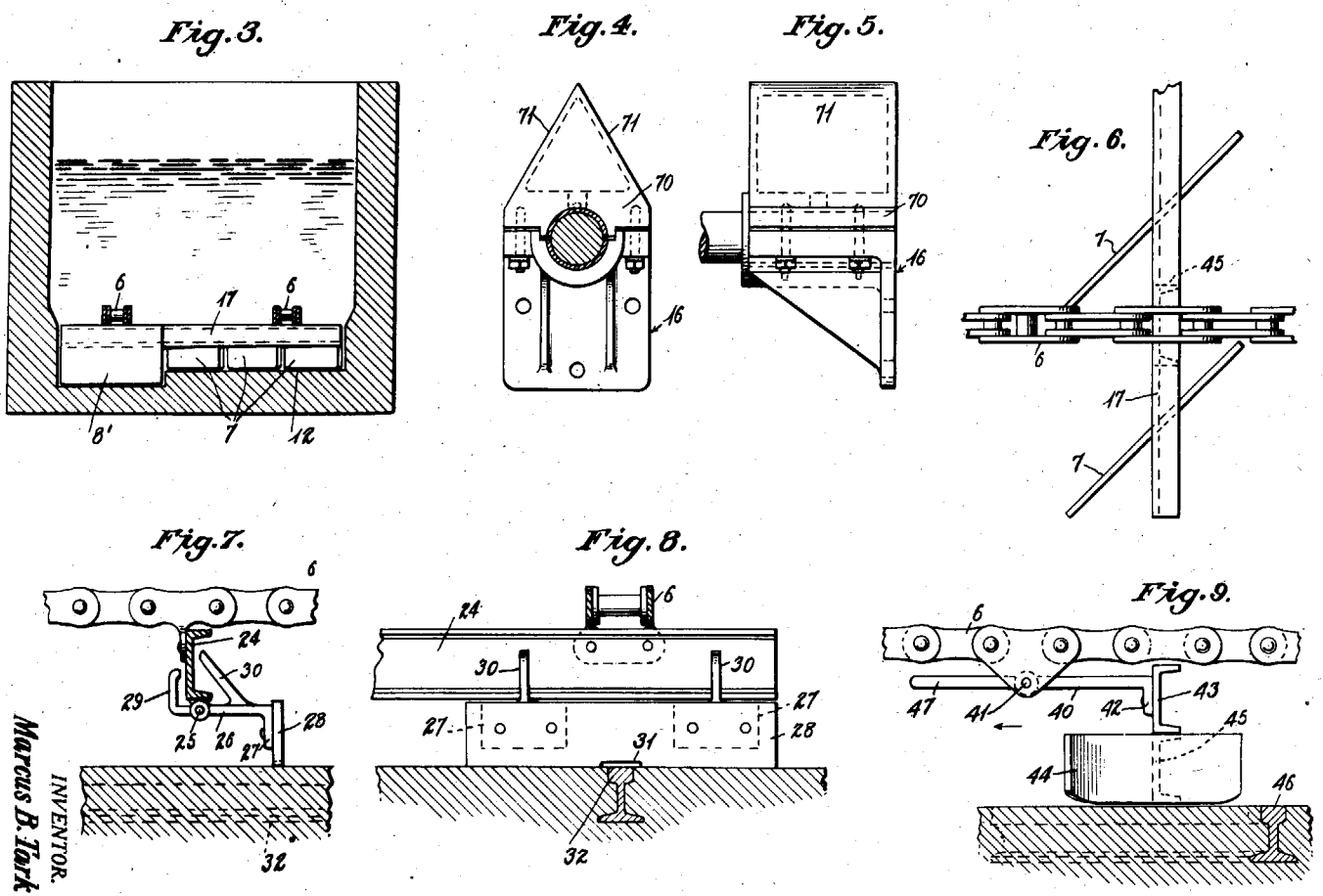
INVENTOR.
Marcus B. Tark
BY Wright Bros.
ATTORNEYS April 6, 1937. M. B. TARK Re. 20,320

SETTLING SYSTEM FOR SEPARATING SOLIDS FROM FLUIDS

Original Filed June 18, 1929 4 Sheets-Sheet 3

INVENTOR.
Marcus B. Tark

BY Wright Bros.
ATTORNEYS

April 6, 1937. M. B. TARK Re. 20,320

SETTLING SYSTEM FOR SEPARATING SOLIDS FROM FLUIDS

Original Filed June 18, 1929 4 Sheets-Sheet 4

INVENTOR.
Marcus B. Tark
BY Knight Bros.
ATTORNEYS

Reissued Apr. 6, 1937 Re. 20,320

UNITED STATES PATENT OFFICE 20,320

SETTLING SYSTEM FOR SEPARATING SOLIDS FROM FLUIDS

Marcus B. Tark, Philadelphia, Pa., assignor to Link-Belt Company, Philadelphia, Pa.

Original No. 1,864,778, dated June 28, 1932, Serial No. 371,876, June 18, 1929. Application for reissue April 23, 1934, Serial No. 722,040

22 Claims. (Cl. 210—3)

This invention relates to apparatus and systems of settling in general and pertains particularly to the removal of settleable solids from fluids. The invention relates principally to the settling and removal of settled solids from water, industrial and domestic sewage and the classification of the settled solids.

One object of the invention is to provide a settling tank for the classification of solids held in suspension in liquids and apparatus therein that collects the settled sludge and removes it to a hopper narrower than the width of the tank.

Another object of the invention is to provide an apparatus for collecting and classifying the sludge carried in liquids, removing the inorganic matter and causing the organic matter to flow out of the tank with the liquid to be further treated in other tanks or by other apparatus.

Another object of the invention is to provide a system of scrapers which will closely follow the contour of the bottom of the tank or other surface over which it passes.

Another object of the invention is to provide a bearing shaped to prevent solids from settling on it and becoming septic.

The invention will be illustrated by several forms of embodiment shown in the accompanying drawings and described in detail in the following specification.

Fig. 3 is a transverse section taken on the line 3—3 of Fig. 1.

Fig. 4 is a detail front view of the bearing,

Fig. 5 is a side view of the bearing,

Figure 10:
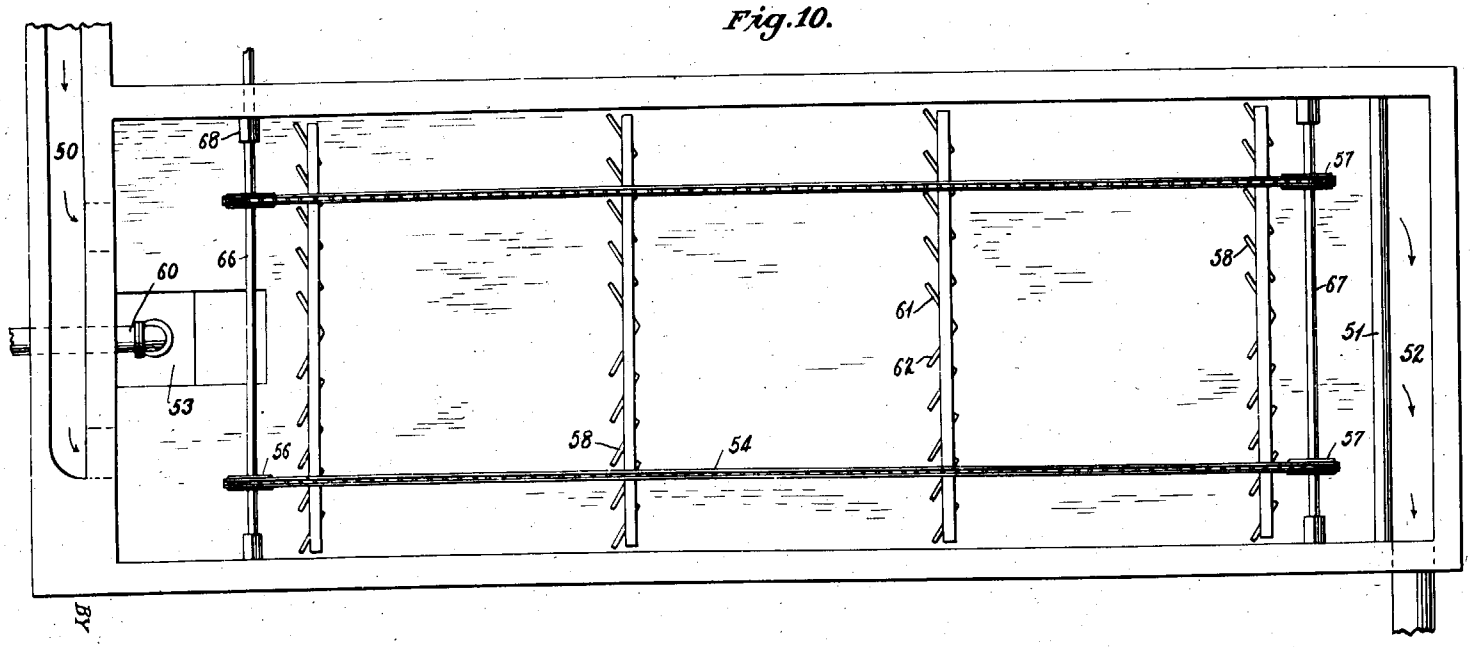
Figure 11:
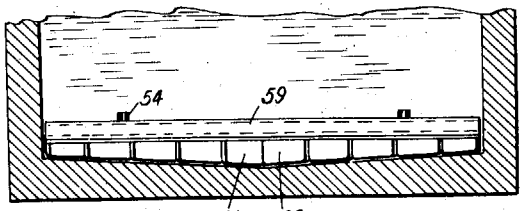
Figure 12:
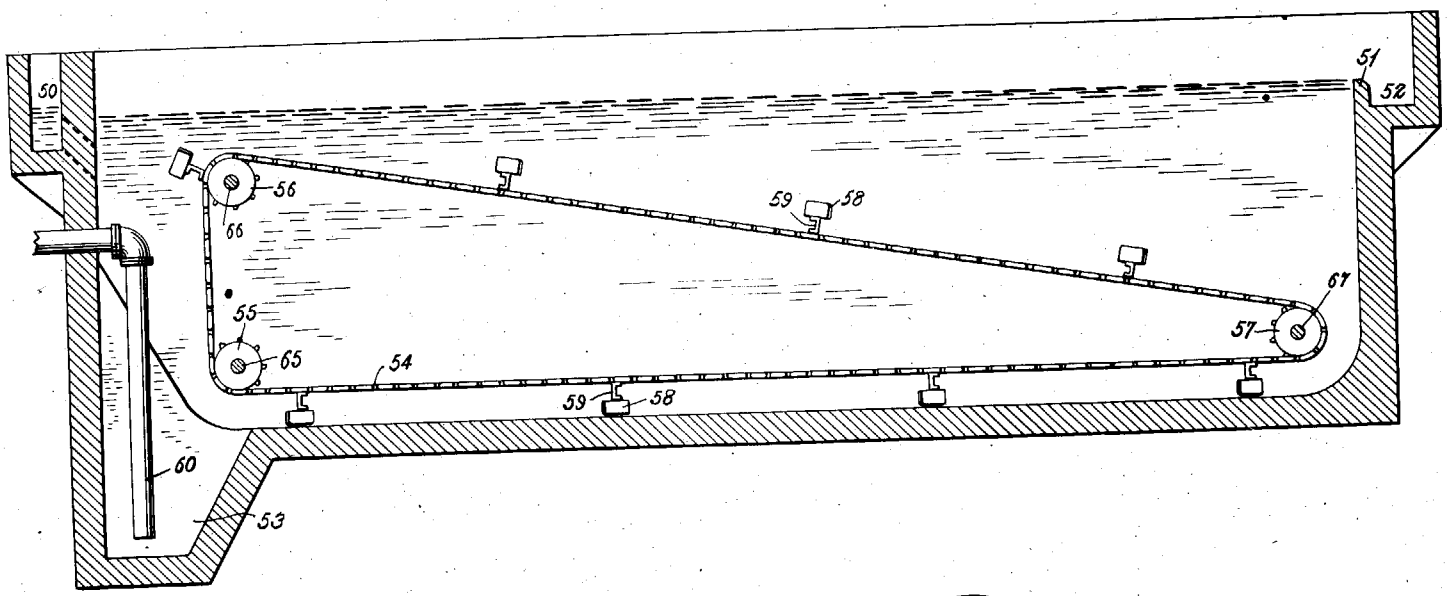
Figure 13:
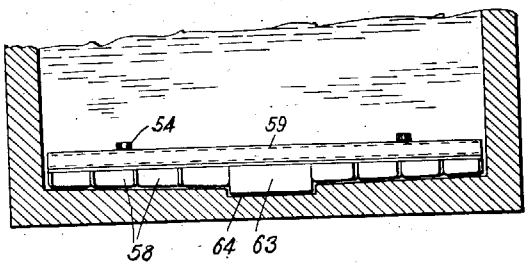

Fig. 6 is a detail plan view of a portion of the sludge scraping system, showing one arrangement of the scraper flights, Fig. 7 is a vertical section of a portion of the scraping system showing another arrangement of a scraping flight, Fig. 8 is a view taken at right angles to Fig. 7, Fig. 9 is a view similar to Fig. 7 showing a modified arrangement of the scraping flight, Fig. 10 is a plan view of a settling tank for removing settled organic matter from sewage or the like, Fig. 11 is a transverse section of Fig. 10, Fig. 12 is a longitudinal medial section of Fig. 10, and Fig. 13 is a transverse section similar to Fig. 11 showing a modified arrangement of the bottom of the tank and the scraping flights.

Figure 1:
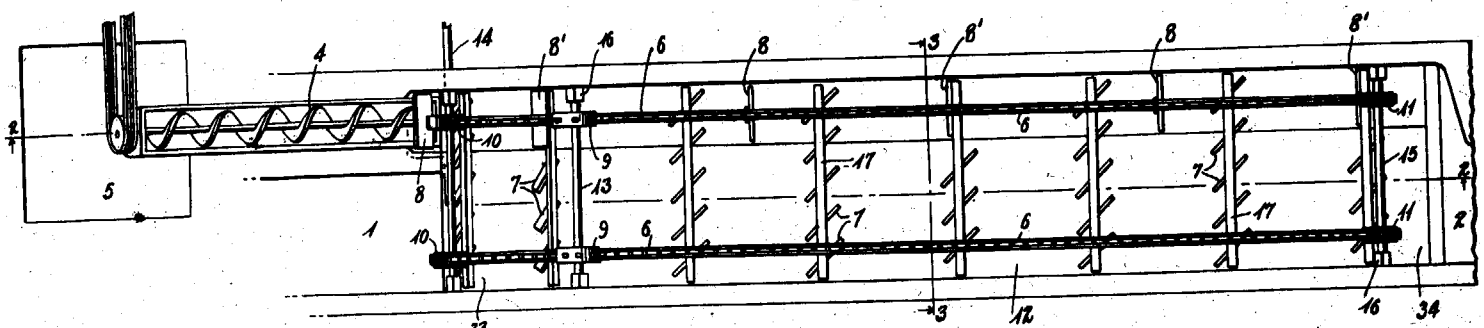
Fig. 1 is a plan view of a settling tank adapted to remove relatively heavy inorganic matter from sewage or the like and to cause the organic matter to pass on in suspension, the upper course of the scraping system being broken away.
Figure 2:
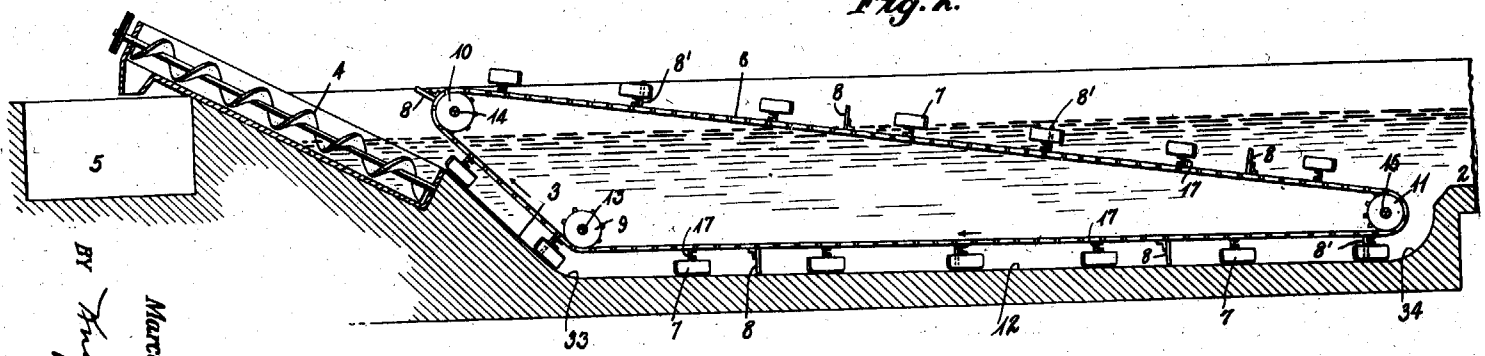
Fig. 2 is a longitudinal section taken on the line 2—2 of Fig. 1.

Referring first to Figs. 1 to 3, the tank has an influent channel 1 and an effluent channel 2, the tank being wider and deeper than the influent and effluent channels. The influent end of the tank slopes downwardly to merge with the bottom, as shown at 3. At one side of the influent channel there is arranged a discharging conveyor 4, the bottom end of which is at the upper end of the sloping wall 3. The conveyor 4 discharges into a pit 5.

A collecting system comprising chains 6 having mounted on them scraping flights 7, 8, 8', is guided by sprocket wheels 9, 10, 11 so that the scraping flights travel along the bottom 12 and up the sloping wall 3. The sprocket wheels are carried by shafts 13, 14, 15 mounted in bearings 16 and the system is driven by a motor (not shown) coupled to shaft 14.

The discharging conveyor 4 being much narrower than the tank, some of the flights, 7, are arranged at an angle to the direction of travel of the scraping system, so that they scrape the settled solids laterally, as well as forwardly, toward that portion of the bottom of the tank which lies in line with the discharging conveyor 4. The flights 7 are mounted on cross bars 17 extending across and secured to the chains 6. At the side of the tank, above that portion lying in line with the discharging conveyor 4, there are some flights, 8, 8', arranged perpendicular to the direction of travel of the scraping system. These flights may be mounted directly on one of the chains 6, and intermediate the cross bars 17, as shown at 8, or they may be mounted on the cross bars in place of some of the obliquely positioned scraping flights, as shown at 8'.

The operation of the system is as follows:

The impure water carrying organic and inorganic matter in suspension flows from influent channel 1 into the tank, which is of larger cross section and therefore causes the velocity of the water to be reduced to some extent, but still the velocity is sufficiently high, say from 6" to 12" per second, and the period of detention sufficiently short, from 1 to 2 minutes to confine the settling largely to inorganic matter. Most of the organic matter remains in suspension and is carried out through the effluent channel 2. The scraping system, being in motion in the direction indicated by arrows in Fig. 2, scrapes the settled solids along the bottom 12, the oblique flights 7 moving the solids laterally as well as forwardly and the perpendicular flights 8, 8' carrying the solids straight forward. The solids are scraped up the incline 3 and dumped into the lower end of discharging conveyor 4. The foot of this conveyor 4 is just below the surface of the water and as it rotates it has a classifying action on the solids, stirring up the organic matter so that it is carried off by the flow of water, but moving the inorganic matter out into the pit 5. This classification can be regulated by the speed and inclination of the conveyor 4. I have shown a screw conveyor merely by way of example and other forms, such as reciprocating conveyors, may be used equally well.

Fig. 3 shows the bottom of the tank to be flat, with a trough in the portion lying in line with the conveyor 4. Instead of this arrangement the bottom may be flat all the way across, or it may have a gradual slope toward the discharging conveyor side, for a part or all of its width.

The scraping flights may be mounted directly on the cross bars 17 as shown in Fig. 6, but in order to allow them to follow the bottom as closely as possible, I prefer to pivot them eccentrically on the cross bars, as shown in Figs. 7 and 8; that is, in such a manner that they can move toward and away from the chains 6. Figs. 7 and 8 show a cross bar 24 having pivoted on it at 25 a horizontal bracket 26 with a vertical end 27 to which a flight 28 is secured in vertical position. The bracket also has arms 29 and 30 adapted to abut against cross bar 24 to limit the extent of its pivotal movement. In the base of flight 28 is inserted a hard wearing piece 31 which rides on a track 32 set into the bottom of the tank. One advantage of the flights pivoted eccentrically is that they are free to follow any changes in contour of the bottom and particularly to follow close into such curved places as indicated at 33 and 34 in Fig. 2, thus keeping these places clean. Another advantage is that the pressure of the flights against the bottom is always uniform, being controlled by their own weight, and they are never required to support the weight of the chain and cross bars, which would increase their friction with the bottom and wear them out unduly quickly.

Another way of securing substantially the same result is shown in Fig. 9. In this case horizontal brackets 40 are pivoted at 41 on the chains 6 and have vertical ends 42 to which are secured cross bars 43. Flights 44 are fixed to the cross bars and an extension 45 is provided on the cross bar to bear on a track 46 set in the bottom of the tank and thereby relieve the flights of wearing friction with the bottom. The bracket 40 extends forwardly at 47 to form a stop adapted to abut against the chain 6 and limit the pivotal movement of the bracket. Counter-clockwise pivotal movement is limited by the abutment of the cross bar 43 against the chain 6.

Figs. 10 to 12 show a settling tank which is intended to remove all settleable solids from the water, usually after the water has been subjected to various treatments to modify the condition of the organic matter in it. The impure water flows into the tank through influent channel 50 and out over weir 51 into effluent channel 52. The velocity of flow is very slow, say in the neighborhood of .25" per second and the period of detention may be from 1½ to 2 hours. A discharge hopper 53 is arranged at the influent end of the tank and is considerably narrower than the width of the tank. In this instance the hopper is shown at the middle of the influent end of the tank. A collecting system comprising chains 54 running on sprocket wheels 55, 56, 57 and carrying obliquely arranged flights 58 on cross bars 59 moves slowly along the bottom of the tank scraping settled solids laterally and forwardly until they come in line with the hopper 53 into which they are dumped. An eduction pipe 60 removes the collected sludge from the hopper 53. The sprocket wheels 55, 56, 57 are carried by shafts 65, 66, 67 mounted in bearings 68. The shaft 66 extends through the side of the tank and is coupled to a driving motor (not shown).

In place of the two oppositely inclined flights 61 and 62 at the middle of the cross bars in Figs. 10 and 11, which serve to move the sludge directly forward to the hopper, a single perpendicular flight 63 may be used as shown in Fig. 13. To facilitate the movement of the sludge I prefer to incline the bottom of the tank toward the center. The bottom may also have at the center a trough 64 in which the middle flight or flights carry the sludge straight forward. The pivotal mounting of the flights may also be used in this final settling chamber.

The bearings 16 and 68 are preferably constructed in the manner shown in detail in Figs. 4 and 5, that is, the bearing caps 70 are peaked to such an extent that their sides 71 are at an angle of at least 60° from horizontal. This will prevent any organic matter tending to settle on them from remaining and forming an accumulation which would become septic. This is particularly important in the final settling chamber where the velocity of flow is slow.

Having described my invention, I claim:

1. A settling tank having at one end a discharge port for settled solids narrower than the width of the tank itself, and a collecting mechanism having means for moving settled solids toward the discharge port end of said tank, said means being adapted to impart lateral motion to solids not in line with said discharge port to bring them into line therewith.

2. A settling tank having at one end a discharge port for settled solids narrower than the width of the tank itself, and a collecting mechanism having means for moving settled solids toward the discharge port end of said tank, said means being adapted to impart lateral motion to solids not in line with said discharge port to bring them into line therewith, the bottom of said tank being inclined upwardly toward said discharge port, said collector having a course of travel conforming to said inclined part of the bottom of said tank.

3. A settling tank having at one end a discharge port for settled solids narrower than the width of the tank itself, a collecting mechanism having means for moving settled solids toward the discharge port end of said tank, said means being adapted to impart lateral motion to solids not in line with said discharge port to bring them into line therewith, and a classifier at said discharge port adapted to remove relatively heavy solids and to stir lighter solids into the liquid again.

4. In apparatus for removing suspended solids from liquids flowing in a conduit, a settling chamber interposed in the conduit, of greater cross section than the conduit and adapted to retard the flow and cause some of the solids to settle, said chamber having an incline at the influent end thereof running from the bottom of said chamber to a point near the surface of the liquid level of the chamber, collecting means for scraping settled solids along the bottom of said chamber toward the influent end and up said incline, and an agitating conveyor arranged to receive the solid matter from the top of said incline and adapted to stir relatively light solids into the liquid and to carry off heavier solids.

5. In a collector for a settling tank, an endless chain, means for guiding and circulating said chain, a cross piece eccentrically pivoted to said chain, and scraping flights mounted on said cross piece.

6. In a collector for a settling tank, an endless chain, means for guiding and circulating said chain, a cross piece eccentrically pivoted to said chain, means limiting movement of said cross piece about its pivot, and scraping flights mounted on said cross piece.

7. In a collector for a settling tank, an endless chain, means for guiding and circulating said chain, a cross piece fastened to said chain, scraping flights mounted on said cross piece, and a wearing shoe on said cross piece adapted to glide on the bottom of the tank and support said chain.

8. In a collector for a settling tank, an endless chain, means for guiding and circulating said chain, a cross piece fastened to said chain, scraping flights mounted on said cross piece, a track in the floor of the tank running parallel to the direction of travel of said chain, and a wearing shoe on said cross piece adapted to run on said track.

9. In a collector for a settling tank, an endless chain, means for guiding and circulating said chain, a cross piece mounted on said chain, a scraping flight on said cross piece perpendicular to the direction of travel of said chain, and other scraping flights on said cross piece inclined to said direction of travel at such an angle as to move settled material toward said perpendicular flight as well as forward.

10. A collector according to claim 8 in which said scraping flight is pivotally mounted on said cross piece.

11. A collector according to claim 9 in which said perpendicular flight is pivotally mounted on said cross piece, and means limiting the pivotal movement of said perpendicular flight.

12. In a settling tank having a sloping end wall merging into the bottom, an endless chain, means for guiding and circulating said chain along said bottom and said sloping end, and scraping flights pivoted eccentrically on said chain and adapted to scrape settled solids along said floor and up said sloping end wall.

13. In a collector for a settling tank, an endless chain, means for guiding and circulating said chain, and scraping flights eccentrically pivoted on said chain and adapted to scrape settled solids on the bottom of the tank.

14. In a rectangular settling tank, a collecting mechanism adapted to move settled solids to a comparatively narrow part at one end of the tank and comprising scraping means traveling longitudinally along that portion of the bottom of the tank in line with said narrow part, said scraping means being adapted to move settled solids straight forward along the line of travel, and additional scraping means traveling over the other portions of the bottom of the tank and adapted to scrape settled solids forwardly and also laterally toward the path of said first-mentioned scraping means.

15. In a rectangular settling tank, a discharging conveyor narrower than the width of the tank located at one end of the tank, a collecting mechanism adapted to move settled solids from the bottom of the tank to said conveyor comprising scraping means traveling longitudinally along that portion of the bottom of the tank in line with said conveyor, said scraping means being adapted to move settled solids straight forward along the line of travel, and additional scraping means traveling over the other portions of the bottom of the tank and adapted to scrape settled solids forwardly and also laterally toward the path of said first-mentioned scraping means.

16. In a device of the class described a settling tank having an inclined end, a collector adapted to scrape settled solids along the bottom of the tank and up said inclined end, and a screw conveyor arranged to receive said solids from said incline, said screw conveyor being adapted to classify the solids and carry off the heavier particles.

17. In a settling tank, a hopper at one end of said tank, the width of said tank being substantially greater than the dimension of said hopper parallel to the width of the tank, and a scraping device adapted to move the sludge from all portions of the floor of the tank to said hopper.

18. In a sedimentation system including a grit chamber, grit removing means traveling along said chamber and including means for collecting in a longitudinal zone settled solids including grit, means for removing such settled solids from said longitudinal zone, and means for cleaning the grit from the other solids and the liquid removed therewith and restoring such other solids and the liquid to the grit chamber.

19. In a sedimentation system including a grit chamber, the combination of grit removing means traveling along said chamber and including means for removing from said chamber settled solids including grit, means for cleaning the grit and returning to the chamber the material separated from the grit, and a device for receiving the grit from such cleaning means; and means for discharging the grit from said device to a point at the outside of said chamber.

20. In a sedimentation system including a grit chamber, the combination of means traveling longitudinally of said chamber for collecting in a longitudinal zone settled solids including grit, means for removing said settled solids from said longitudinal zone and means for separating grit from the solids and liquid removed from the chamber.

21. In a sedimentation system, a rectangular settling tank, longitudinally movable means adapted to displace settled material upon the floor of the tank and assemble it in a longitudinal zone parallel with the major axis of the tank, means for withdrawing such settled material from the longitudinal zone, means for separating the heavier solids from the lighter in such withdrawn material and for discharging the heavier solids from, and for returning the lighter solids and associated liquid to the tank.

22. A grit washer comprising an elongated generally rectangular grit settling chamber of substantial depth through which sewage to be treated is adapted to flow, a grit collecting conveyor movable along the floor of the chamber in a direction parallel with and opposite to the flow of the liquid through the chamber, having collecting blades projecting above the floor of the chamber a relatively short distance and terminating far below the level of the liquid in the chamber whereby the flow of liquid through the chamber is substantially uninterrupted, a grit washing hopper adapted to receive the grit collected by the collecting conveyor and to contain sewage liquid, the hopper having an inclined floor extending partially above and partially below the level of the liquid therein, a rotary screw conveyor and washer lying along said floor and partially immersed in and partially extending above the liquid in the hopper, and means independent of the conveyor operating means for rotating the screw to convey the grit in the hopper upwardly along the inclined floor, the speed of rotation of the screw being such that adjacent the zone of emergence from the liquid, the grit is violently agitated in the presence of the liquid to free it from organic materials, and means for returning the liquid with the organic materials which have been washed from the grit to the stream of sewage for further treatment and for discharging the grit conveyed by the screw from the system.

MARCUS B. TARK.